United States Patent [19]
Kremser

[11] Patent Number: 5,689,250
[45] Date of Patent: Nov. 18, 1997

[54] ULTRASOUND OBSTACLE DETECTING PROCESS

[75] Inventor: Johann Kremser, Bruck a.d. Mur, Austria

[73] Assignee: Mayser GmbH & Co., Inc., Germany

[21] Appl. No.: 649,630

[22] PCT Filed: Sep. 20, 1995

[86] PCT No.: PCT/EP95/03705

§ 371 Date: Aug. 14, 1996

§ 102(e) Date: Aug. 14, 1996

[87] PCT Pub. No.: WO96/09559

PCT Pub. Date: Mar. 28, 1996

[30] Foreign Application Priority Data

Sep. 23, 1994 [DE] Germany ............ 44 33 957.7

[51] Int. Cl.$^6$ .................................... G08G 1/00
[52] U.S. Cl. .............. 340/904; 340/903; 340/943; 340/435; 367/87; 367/98; 367/909; 364/461
[58] Field of Search ................. 340/903, 943, 340/904, 435; 367/87, 97, 98, 909; 364/461

[56] References Cited

U.S. PATENT DOCUMENTS

| | | | |
|---|---|---|---|
| 4,623,032 | 11/1986 | Kemmer | 340/904 |
| 4,809,178 | 2/1989 | Ninomiya et al. | 364/461 |
| 4,845,682 | 7/1989 | Boozer et al. | 367/93 |
| 5,077,701 | 12/1991 | Lill | 367/98 |
| 5,239,515 | 8/1993 | Borenstein et al. | 367/87 |
| 5,319,611 | 6/1994 | Korba | 367/909 |

FOREIGN PATENT DOCUMENTS

| | | |
|---|---|---|
| 0 326 623 | 8/1989 | European Pat. Off. . |
| 3739128 A | 6/1989 | Germany ............ 340/903 |
| 2 059 590 | 4/1981 | United Kingdom . |
| 81/00456 | 2/1981 | WIPO . |
| 93/06503 | 4/1993 | WIPO . |

OTHER PUBLICATIONS

"Experiments with a Mobile Robot Operating in a Chuttered Unknown Environment," T. Skewis et al., IEEE, May 1992, pp. 1482–1487.

International Search Report dated Feb. 2, 1996.

*Primary Examiner*—Jeffery Hofsass
*Assistant Examiner*—Timothy Edwards, Jr.
*Attorney, Agent, or Firm*—Evenson, McKeown, Edwards & Lenahan, P.L.L.C.

[57] ABSTRACT

The invention provides a process and apparatus for the detection of obstacles by means of ultrasound waves having an enhanced ability to distinguish between echoes caused by obstacles and those caused by interference signals. Ultrasound pulses are emitted by an ultrasound transmitter unit, and are received by an associated ultrasound receiver unit. (A plurality of such transmitters and receives may also be used.) Ultrasound echoes detected by the receiver units are used to form echograms in which detected echoes are projected. The echogram thus measured is used to generate an analysis echogram, based on information contained in the measured echograms. In particular, the most recent analysis echogram is modified depending on the size and location of echoes contained in the measured echogram. Signals contained in the analysis echogram are then compared with predetermined threshold values to distinguish between echoes reflected from obstacles and echoes due to interference.

13 Claims, 5 Drawing Sheets

1

ULTRASOUND OBSTACLE DETECTING PROCESS

BACKGROUND AND SUMMARY OF THE INVENTION

The invention relates to an ultrasound process and apparatus for detecting obstacles, such as is used, for example, for driverless vehicles which move in lanes of an automated storage system. By means of the process, the vehicles can detect obstacles in the lanes, such as persons situated there, and can stop in time. In such devices, distinguishing between obstacle-caused ultrasound echoes and ultrasound-frequency interference signals can be problematic.

A process of this type is described in European Patent Document EP 0 326 623 A1. In the process described there periodic ultrasound pulses are emitted simultaneously by two transmitters which are situated side by side, and any ultrasound echo which is reflected by an existing obstacle is detected by receivers arranged at the site of the transmitters. The received echo is analyzed in such a manner that the coordinates of an obstacle in the emission direction as well as transversely thereto can be determined from the echo time. In this case, more than two ultrasound transmitters may be provided which will then, in each case, be controlled in pairs for sequentially generating the pulses. Each original pulse may contain one or several interlaced frequencies; and, in addition, the transmitter frequencies may be varied from one scan to the next by way of software algorithms in order to avoid a failure to recognize an obstacle which reflects ultrasound waves of a specific frequency with a phase shift in the proximity of $\pi$.

An object of the invention is to provide an ultrasound obstacle detecting process of the initially mentioned type by means of which obstacles can be very reliably detected, even if ultrasound-frequency interference signals are present.

This problem is solved by the process according to the invention, in which the respective echogram sensed after each ultrasound pulse emission is subjected to an envelope curve evaluation during which previous measuring cycles are taken into account. For this purpose, amplitudes which are also found at an isochronous point in preceding echograms are intensified while amplitudes which occur only sporadically in successive echograms are attenuated. This technique makes advantageous use of the fact that, in contrast to an actual obstacle echo, spurious echoes (for example, of reflecting surfaces in a marginal area of the actual ultrasound levels or of industrial noise sources) for a specific measuring duration, do not remain coherent with respect to the emitted ultrasound pulses. By means of the evaluation according to the invention, such uncorrelated spurious echoes are suppressed, while the coherent obstacle echoes are intensified, which considerably improves differentiation between spurious echoes and obstacle echoes. From the "analysis echograms" obtained in this manner, an obstacle can be very reliably detected and its position can be determined with high precision relative to the location of the ultrasound transmitter and receiver. In particular, tests have shown that persons wearing clothing having comparatively weak ultrasound reflection characteristics (and who therefore can otherwise be detected by means of ultrasound only with difficulty), can be very reliably recognized as obstacles by means of this method.

A preferred embodiment of the process according to the invention utilizes an advantageous evaluation method in which newly appearing echo envelope curves are taken into account only when a given amplitude threshold value is exceeded, and the amplitudes of the previous analysis echogram are reduced by a given factor when the amplitude of a corresponding subsequently measured isochronous echogram no longer reaches the given threshold value. As a result, within relatively few measuring cycles, coherent obstacle echoes are considerably intensified relative to the incoherent spurious echoes, even if, in the case of an individual measurement, the latter have higher amplitudes than the obstacle echoes.

In a further embodiment of the invention, the areas of the echo curves which are generated by the evaluation and which exist in the analysis echograms obtained after a specific number of measuring cycles, are determined and are compared with the two given threshold values. If the area of an echo is above the upper threshold value, it is interpreted as an existing obstacle. If the area of an echo is between the lower and the upper threshold value, a conclusion is drawn that an obstacle is present only when the area of a corresponding echo of an adjacent transmitter and receiver unit is also larger than the lower threshold value.

Another embodiment of the invention offers additional certainty of detection for specific applications. In this embodiment, echograms obtained in the continuous operation (which, depending on the requirement, may be the measured echograms or the analysis echograms derived therefrom) are compared with corresponding echograms which were previously obtained by computer-aided simulations or empirical test series and were stored. This approach takes into account the fact that the envelope curve forms of the echoes in the case of a given original ultrasound pulse usually depend in a characteristic manner on the object which reflects these echoes. By means of the echo envelope curve comparison, therefore a conclusion concerning the type of object can be drawn with greater certainty. Another possible application of this method consists of the steering of driverless vehicles which always travel along a specific route, such as transport vehicles in lanes of an automated storage system. By computer simulation of the storage hangar geometry (or even better, by means of test drives), echograms may be sensed along the whole driving path, and stored. As soon as significant deviations occur in the subsequent normal operation, information may be obtained in advance concerning the presence of an obstacle, or the information thus obtained is analyzed and combined with the obstacle information from the analysis echograms.

A further embodiment of the invention prevents possible misinterpretation when the ultrasound transmitters and receivers move at a detectable speed relative to an obstacle and the distance of the obstacle therefore changes rapidly. Due to the relative speed, the time interval between transmission of the pulse and detection of the obstacle echo becomes continuously larger or smaller. This is taken into account by appropriate follow-up of the echograms so that the correlation between the original pulse and the obstacle echo is correctly maintained, and the obstacle echoes are not erroneously suppressed by the evaluation process.

Still a further embodiment of the invention prevents misinterpretations due to excessive ranges. That is, a farther removed obstacle with a higher ultrasound reflection may supply an echo amplitude of approximately the same size as a closer obstacle with a lower ultrasound reflection. If the echo of the farther removed obstacle from an earlier measuring cycle is coincidentally received simultaneously with the echo of a closer obstacle from a later measuring cycle, the system may erroneously draw the conclusion that the close obstacle is still present, even if it has moved out of the detection area. This error is prevented by event-dependent limitation of the emission level in each case to distances only a little larger than those of a detected obstacle.

Yet another embodiment of the invention reliably suppresses spurious echoes which occur at fixed periodic intervals and which, in the case of an accidental coincidence with a fixed measuring cycle frequency, may simulate a false obstacle echo. Such spurious echoes may, for example, originate from ultrasound-frequency industrial noise or from adjacent ultrasound obstacle detecting systems. By means of preferably randomly distributed measuring cycle frequency variations, such disturbing accidental spurious echo coincidences are eliminated so that the spurious echoes are not intensified by the evaluation process to form incorrect obstacle echoes.

Finally, another embodiment of the invention carries out a preliminary filtering of the measured echograms in the receiving amplifiers connected behind the ultrasound wave receivers in a manner which increases the capacity of the system to differentiate between spurious and obstacle echoes, and permits a refined determination of the location of the obstacle. In this embodiment intensification of the reception is given not only as a function of time during the reception of an echogram as, for example, a monotonically rising function of time elapsed after the emission of an ultrasound pulse, but also as a function of the event in a variable manner. The intensification may therefore be adjusted to be higher in the time ranges in which obstacle echoes occur and, in the remaining time ranges may be adjusted to be lower than in the normal obstacle-free variation in time. In favorable circumstances, this measure achieves the most extensive suppression of spurious echoes in a single process step. By means of the preferably software-controlled intensification adjustment, the course of the intensification curve may, in addition, be adapted precisely to the respective physical circumstances for the sound propagation in the space in its basic function, whereby the emission characteristics of the ultrasound sensors can be modified corresponding to the echo events.

Other objects, advantages and novel features of the present invention will become apparent from the following detailed description of the invention when considered in conjunction with the accompanying drawings.

DETAILED DESCRIPTION OF THE DRAWINGS

Figure 1:
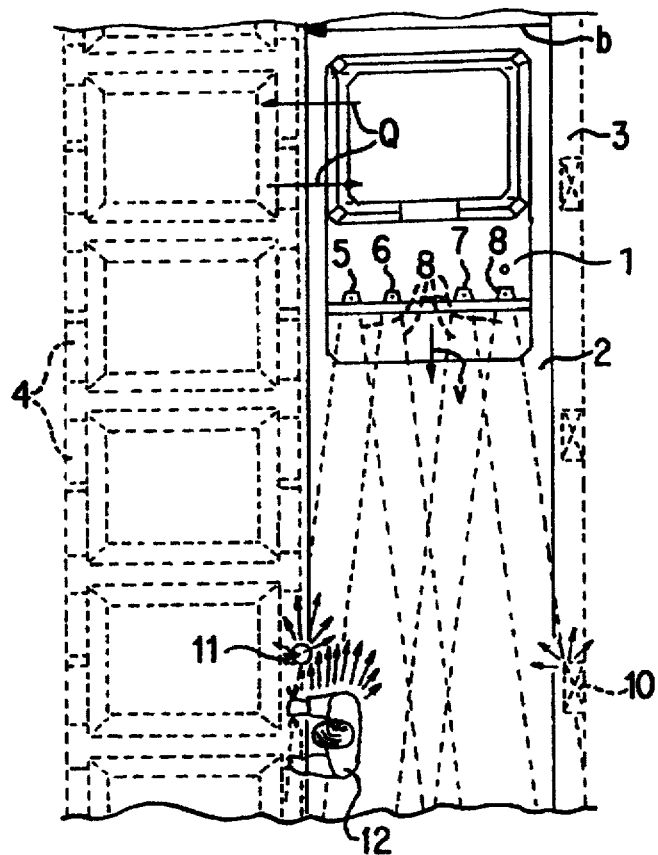
FIG. 1 is a top view of a driverless vehicle equipped with an ultrasound obstacle detecting system according to the invention, in an automated storage system.

FIG. 1 shows a driverless vehicle 1 which is part of a driverless transport system (DTS) for a storage depot, which comprises several vehicles of this type. The vehicle 1 travels along a narrow storage depot lane 2 whose width (b) is only slightly larger than the vehicle width. The illustrated lane 2 is bounded on one side by a wall 3, while loading ramps 4 are situated on the other side on which transport goods are loaded onto and unloaded from pallets, by means of cross conveyors, as indicated by means of arrows (Q).

In order to ensure timely stopping of the vehicle 1 in front of obstacles situated in the lane 2, it is equipped with an ultrasound obstacle detecting system. The obstacle detecting system contains four ultrasound converters, each comprising an ultrasound transmitter/receiver unit 5, 6, 7, 8 in the form of an electrostatic converter, which are arranged in a spaced manner along the transverse direction of the vehicle. (The electrostatic converter has a better wide-band capacity than a piezo-converter which can also be used, and thus is particularly well suitable for a multifrequency operation.) Depending on the application, more or fewer than four ultrasound converters can be used.

By way of the converters 5 to 8, ultrasound pulses are emitted in a periodic sequence, from the vehicle 1 toward the front of the vehicle. By reception of ultrasound echoes reflected by objects which are situated in the area of the emitted ultrasound pulse cones 9, the vehicle 1, which advances at a speed (v) of typically, for example, 1 m/s, can detect these objects. If such objects are situated in the lane 2 to be travelled, they cause the vehicle 1 to stop.

As an example, FIG. 1 illustrates ultrasound wave reflections emanating from a vertical supporting pillar 10 which interrupts the exposed concrete wall 3, a construction element 11 of the loading ramps 4, and a person 12, for example, a storage depot worker. Of these three objects 10, 11, 12, which reflect as described above, only the person 12 represents a true obstacle for the vehicle 1. The detection of persons by means of ultrasound echoes is not simple, however, because fabrics of clothes, in comparison, for example, to metallic objects or concrete walls, have relatively poor ultrasound reflection characteristics. Another impediment to reliable ultrasound obstacle detection lies in the fact that, in receiving the ultrasound waves which are of actual interest, (being reflected by real obstacles, and referred to hereinafter as "inherent echoes"), it is unavoidable that other ultrasound waves are also detected, which are so-called defect echoes (FE), particularly spurious echoes of ultrasound-frequency industrial noise and possibly outside echoes from other vehicles of the system.

Figure 2:
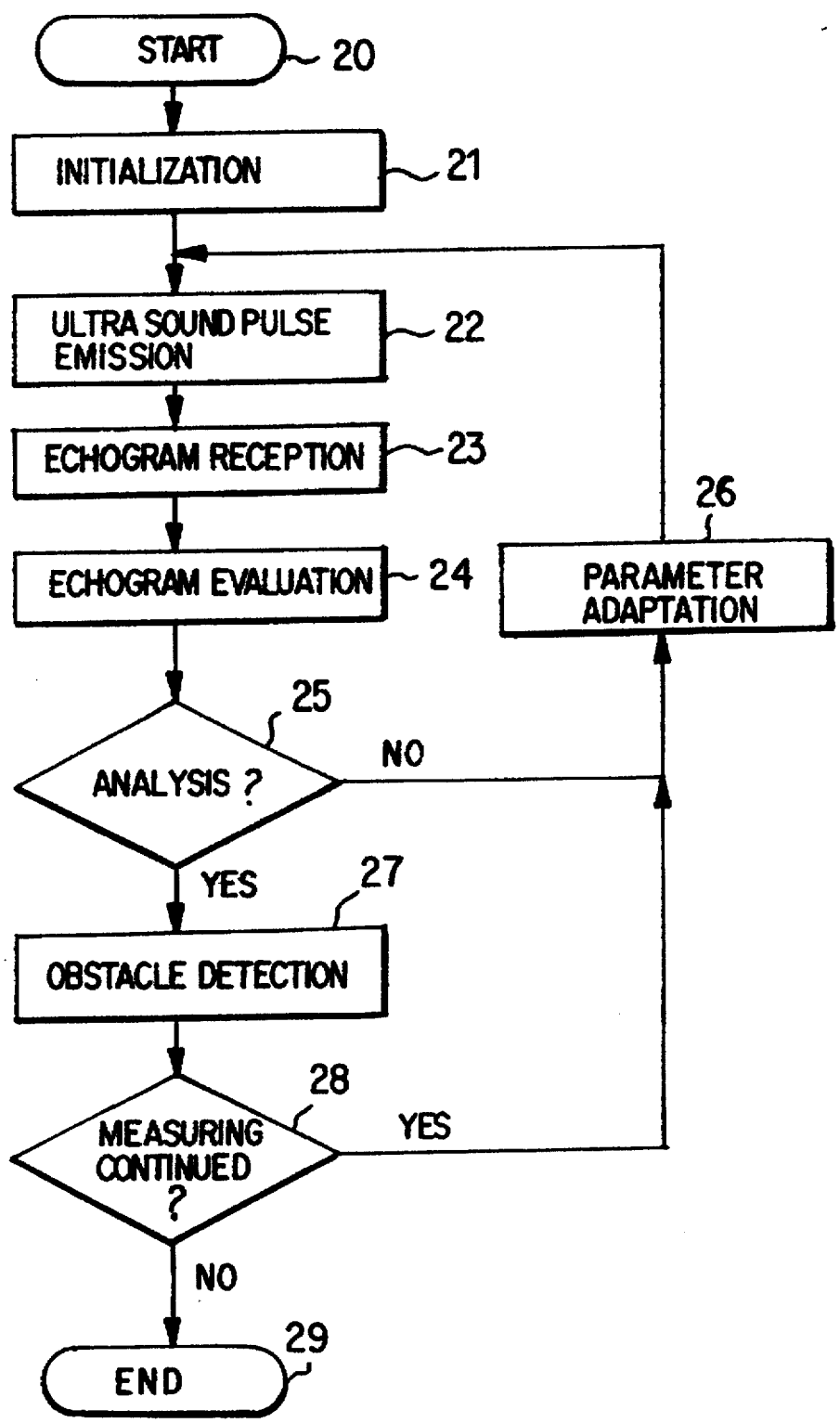
FIG. 2 is a flow chart of the detecting process carried out by the ultrasound obstacle detecting system of the vehicle of FIG. 1.

FIG. 2 illustrates the sequence of the ultrasound obstacle detecting process carried out by the system installed in the vehicle 1, which can also reliably detect persons as obstacles. After the starting step 20, initializing steps take place which are combined in the initializing step 21 in the flow chart of FIG. 2. Initialization comprises, for example, a self-test of the hardware components, such as the ultrasound converters 5 to 8 and/or of the digital and analog modules connected to the outputs of the ultrasound converters 5 to 8. Also, in step 21, the various initial operating parameters are determined, as, for example, the one or more ultrasound frequencies which are used, the measuring cycle duration, the intensification of the ultrasound reception amplifiers, the original pulse emission level and the threshold values for the later echo analysis.

Next, in step 22, ultrasound pulses are emitted. For this purpose, all four converters 5 to 8 are controlled simultaneously for the emission of equiphase ultrasound pulses. Alternatively, the converters may also be controlled sequentially in pairs simultaneously from one vehicle side to the other. Furthermore, event-dependent adaptations are also possible, for example, those which are carried out in the case of a detected obstacle. Thus, the emission levels of the original pulses may be adapted, for example, by way of a software algorithm, to detected obstacles. If the emission level is adjusted in each case so that the ultrasound wave range is not much larger than the distance from the nearest obstacle, errors due to excessive ranges can be prevented; for example, a wall which is farther away may furnish the same echo amplitude as a person positioned closer by. If therefore accidentally a farther removed wall supplies an echo from an earlier emission pulse, which echo is isochronous with that of a later emission pulse from a person situated closer by, this emission level limitation prevents the system from erroneously concluding (because of the echoes reflected by the wall), that the closer person is present if he or she has already moved out of the ultrasound detection range. Furthermore, in the case of serial control of the adjacent ultrasound converters 5 to 8, the scanning rate (that is, the duration of a full scanning cycle along the whole converter series) can be adapted according to the event, in that the rate is selected, for example, to decrease as the detected surface of an obstacle increases.

Each emitted pulse consists of a high-frequency pulse sequence which preferably contains two pulse groups of different frequencies. By means of this multifrequency operation, obstacles can be recognized with greater reliability because, at specific frequencies, some materials have a very low degree of reflection in comparison to those at other frequencies. Thus, for example, a terry cloth fabric can absorb ultrasound at 51 kHz almost completely, while it reflects the frequency of 53 Khz sufficiently. Furthermore, in the case of several vehicles equipped with the obstacle detecting system, a frequency sequence for the original pulses may be provided which is unique for each vehicle, so that outside echoes from other vehicles can then be reliably recognized. In the echograms of FIGS. 3A–3F, which are explained in detail hereinafter, the original pulse envelope curves are on the left in each case.

After the simultaneous emission of an original pulse by all four converters 5 to 8, or alternatively, by at least two converters respectively, the echograms (that is, the enveloping curves of arriving ultrasound echoes) are received in step 23 and are evaluated in step 24. FIGS. 3A–3F depict oscilloscope images in which the lower half shows respective echograms obtained from the converter 5 (arranged farthest to the right on the vehicle), and in which the upper half shows respective echograms obtained from the adjacent converter 6. In this case, the oscilloscope images (MEi; i=1, ...., 6) shown on the left represent the echograms actually measured on the converters 5, 6 in six successive measuring cycles, while, on the right next to each of these echograms (ME1 to ME6), the associated analysis echograms (AEi; i=1, ..., 6) are shown which, as described hereinbelow, are derived for reliable recognition of inherent echoes even when additional outside echoes are present. For orientation purposes, the original pulses (SE) are also shown. By means of the other converters 7, 8, the process is analogous and does not have to be explicitly discussed.

The measuring sequence begins with the taking of a first measuring echogram (ME1) after the first emission of an original ultrasound pulse (SE) simultaneously at two converters 5, 6. (FIG. 3A) Each of the original pulses (SE) consists of two pulse groups of different frequencies which are separated from one another by a separating pause, which is shown in the echograms as an approximately central, vertical separating line of the envelope. Within a time window forming the horizontal axis of the oscilloscope images after the emission of the respective original pulses (SE) (in the example, during a time period of 20 ms), the ultrasound waves arriving at the converters 5 to 8 are received. For reasons of clarity, the respective original pulses (SE) as well as those echoes which will later be determined to be inherent echoes and are of interest (that is, echoes originating from obstacles) are indicated by a solid line; other echoes are drawn by interrupted lines.

As shown in the first measuring echogram (ME1) (FIG. 3A), within this time window, four echoes (E1, E2, E3, E4) are detected by each of the two converters. These echoes arrive at the respective converters 5, 6 almost simultaneously and are therefore part of the same reflection source. Accordingly, in the two converter echograms, they are marked by the same reference numbers although the details of the echo envelope differ. The first echo E1 is relatively weak but reaches more than half the maximal amplitude defined by the original pulse. The second echo (E2) is weaker, and has an amplitude which is less than half the amplitude maximum. In contrast, the two last echoes (E3, E4) are strong echoes of an appreciable width and amplitude. The last echo (E4) is stepped considerably in the manner of a staircase which indicates that only a partial reflection has taken place on an object which reflects diffusely because of unevenness. (A further analysis, described hereinafter, will show that this echo (E4) is reflected by the person 12 in FIG. 1.) In contrast, the third echo (E3) has a very high amplitude and is very similar to the original pulse (SE), so that there is a high probability that this echo originates from reflection on a smooth, flat very reflective surface. In this example, the third echo (E3) is a reflection from the construction element 11 in the loading ramp area 4 of FIG. 1.

In view of the usually relatively weak direction-specific ultrasound reflection behavior, the occurrence of the echoes (E1 to E4) on the two converters 5, 6 respectively is understandable if it is taken into account that, for example, at a typical converter separation of approximately 30 cm and a distance of the ultrasound-reflecting object of 2.5 m, there is an angular difference between the two converters 5, 6 of approximately 6°. In a conventional manner, which will therefore not be described in detail herein, the transit time differences of corresponding echoes are detected on the different converters and are used to determine the position in the longitudinal and transverse direction of the reflecting obstacles which are later recognized as obstacles. Typical transit time differences are, for example, in the range of 100 µs.

In order to achieve a stricter separation of inherent echoes and interfering erroneous (that is, outside or spurious) echoes, use is made of the fact that the inherent echoes always have a fixed time correlation with respect to the emitted ultrasound pulse (SE), which correlation does not exist for echoes. Accidental time correlations of erroneous echoes of other vehicles are filtered out by randomly distributed variation of the measuring cycle duration. For this purpose, the time between the emission of two ultrasound pulses (SE) within a given range is randomly selected, the measuring cycle frequency amounting to an average of, for example, approximately 30 Hz. This ensures that any coincidental short-term correlation of an outside echo to the original pulse (SE) of the considered vehicle will disappear during the next measuring cycles. (A distinction may also be made based on the fact that the original pulses (SE) of the different vehicles are coded with different frequencies; that is they are made up of pulse groups with mutually different frequency sequences.) The time correlation of the inherent echoes, which is characteristic under these circumstances, can then be used over the course of several measuring cycles, to distinguish the inherent echoes from the totality of received echoes. For this purpose, the first measuring echogram (ME1) alone will not be sufficient. For example, in the case of universally higher amplitudes of the echoes (E1 to E4) on the converter 5 (situated on the right side of the vehicle) in contrast to those of the adjacent converter 6, it can be determined with sufficient certainty from the first measuring echogram only that the echo-causing objects are closer to the converter 5 arranged on the right than to the adjacent converter 6; it cannot be reliably decided, however, whether these objects are situated in the monitored area, that is, in the lane 2 of the storage depot.

In the following measuring cycles, in order to separate the inherent echoes reliably from erroneous echoes, after each detected measuring echogram (MEi; i=1,2, ... ), an "analysis echogram" (AEi; i=1,2, ... ) is determined as follows. First, the echo surfaces of the measuring echograms are formed by scanning the amplitude values of the envelope of the echoes in each of a given number of time intervals; for example, 128 scanning intervals of a length of 125 µs each. For the formation of the first analysis echogram (AE1), those scanning values from the first measuring echogram (ME1) which are above a given amplitude threshold value are divided by a natural number, in this case, 4, while the scanning values below this threshold value are not taken into account. For this purpose, the threshold value is set as a function of the event, that is, as a function of the received echograms, and is variable, for example, in ten steps, so that it is adapted to the intensity of the respective existing echo. As an alternative, it may also be set to a fixed value; for example, half the amplitude maximum which is given by the original-pulse amplitude. In the present example, the threshold value is precisely half the amplitude maximum, whereby the illustrated first analysis echogram (AE1) is created in which the second echo (E2) (having an amplitude which is less than the threshold value) no longer exists. In the shown analysis echograms, which can be stored in the system as data sets, and which are shown only for illustration purposes in the same oscilloscope image as the measuring echograms, the respective unchanged original pulse (SE) is also shown. The three echograms (E1, E3, E4) in the first measuring echogram (ME1) which exceed the threshold value are maintained, albeit in a modified form in the first analysis echogram (AE1) as analysis echoes (A1, A3, A4).

Referring once again to FIG. 2, after the establishment of the first analysis echogram (AE1) in step 24, the process continues with a query 25 as to whether an analysis (described below) is to be carried out, which may be determined in a number of ways. For example, such an analysis may be performed after a predetermined number of measuring cycles (steps 22-24) have occurred; or alternatively, an analysis may be implemented in response to an input command from a user by means of a switch. In a preferred embodiment, however, the analysis in step 27 is performed periodically, upon the expiration of predetermined regular intervals of, for example, 300 to 500 ms.

If it is determined, in step 25 that an analysis is not to be carried out, in the step 26, the parameters are suitably adapted for carrying out a new measuring cycle. Specifically, such adaptation is performed for these parameters, which vary in an event-dependent manner (that is, as a function of the echoes obtained in the previous measuring cycle or of the recognized obstacles). These include the amplification of the reception amplifiers, the emission levels for the original ultrasound pulses, as well as the amplitude threshold value, which as noted previously can be adapted to adjust the sensitivity of the amplitude evaluation. In contrast to the conventional approach in which the reception intensification is given as an invariable monotonically and concavely increasing function of time during each measuring cycle, (especially an exponential function), in the present invention, the time variation of the reception intensification is event-dependent for the respective next measuring cycle so that, for example, the intensification in a time domain in which echoes occurred in preceding measuring cycles (indicating a relevant obstacle), may be increased. This measure alone can achieve a considerable suppression of spurious echoes in comparison to inherent echoes. With the adapted parameters, a return is then carried out in step 22 (FIG. 2) for the emission of a new ultrasound pulse in order to carry out the next measuring cycle.

In the second measuring cycle (FIG. 3B), the echograms (ME2) taken after the emission of the original pulses (SE) show that the second echo (E2) has disappeared while the other echoes (E1, E3, E4) appear similar to those of the first measuring cycle. In this case, the first echo (E1) has become weaker while the fourth echo (E4) seems to become stronger. The current second measuring echogram (ME2) is analyzed and used to transform the first analysis echogram (AE1), which serves as the starting point into a current new analysis echogram (AE2). For this purpose, the echo surface scanning values of the given scanning intervals are again determined from the second measuring echogram (ME2) and are compared with the set amplitude threshold value. For each scanning interval, the pertaining analysis echogram value is then updated according to the following three evaluation criteria:

(i) When the scanning value from the current measuring echogram (ME2) is smaller than the amplitude threshold value and the corresponding previous analysis echogram value is zero, the zero value is maintained for the new analysis echogram. Thus, echoes below the set threshold value are filtered away.

(ii) When the scanning value from the current measuring echogram (ME2) is smaller than the amplitude threshold value but the corresponding previous analysis echogram value is not zero, the latter is multiplied by a factor smaller than 1, for example, by means of a division by a natural number, in the present case by 4, and this reduced value is stored as a new analysis echogram value. This measure utilizes the high instability in the time relation of erroneous echoes and the original pulses (SE) (which can be explained by a constant change of edges, surfaces, corner areas, etc.) for suppression of erroneous echoes. Even if an erroneous echo in a particular measuring cycle has an amplitude which is comparably large, or even a larger, than the inherent echoes, because of this evaluation criterion, and the lack of a correlation between an erroneous echo and the original pulse (SE), the erroneous echo is caused to disappear within a few measuring cycles. Likewise, erroneous echoes which, although they occur continuously, have weaker amplitudes, are successively eliminated in the course of the measuring cycles.

(iii) When the scanning value in the current measuring echogram (ME2) is larger than the amplitude threshold value, this scanning value is added to the previous analysis echogram value to form the new analysis echogram value. In this manner, the effect of continuously occurring echoes which are consistently correlated to the original pulses with respect to time, is increased. Particularly echoes of objects with a spatially limited expanse and a very homogeneous surface structure have this characteristic. In the example, this is particularly true for the echo caused by the person 12.

By the successive application of these criteria for each scanning time interval, the second analysis echogram (AE2) is created from the first analysis echogram (AE1) and the second measuring echogram (ME2). In the example, the first analysis echo (A1) for the converter 6 is divided by four (according to rule (ii) above), and becomes so small that it now effectively disappears from FIG. 3B. (In practice, a limit value may be set, below which an echo value is set to zero instead of being further divided by 4, in order to avoid unnecessary calculations and storage of the associated data.) On the two last analysis echoes (A3, A4), lateral decreases occur which are caused by the movement of the vehicle 1, since the distances between the vehicle and the echo-causing objects (and therefore also the echo transit time) have changed slightly from the first to the second measuring cycle.

Figure 3A:
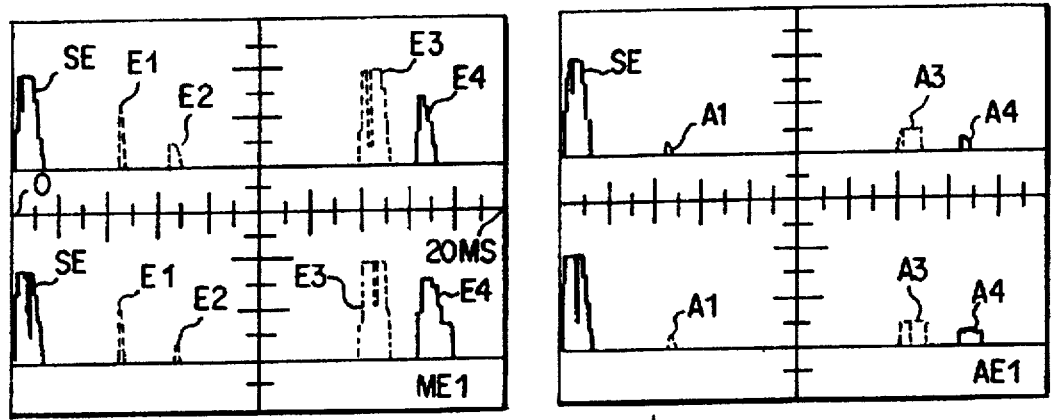
FIGS. 3A through 3F are views of a time sequence of six measured echograms (left half) of two ultrasound sensors of the vehicle of FIG. 1, as well as the analysis echograms (right half) derived therefrom according to the invention.
Figure 3B:
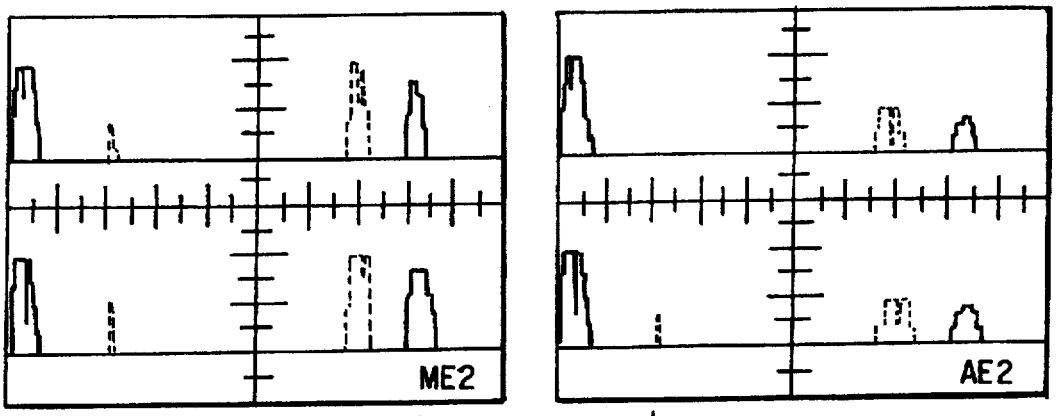
Figure 3C:
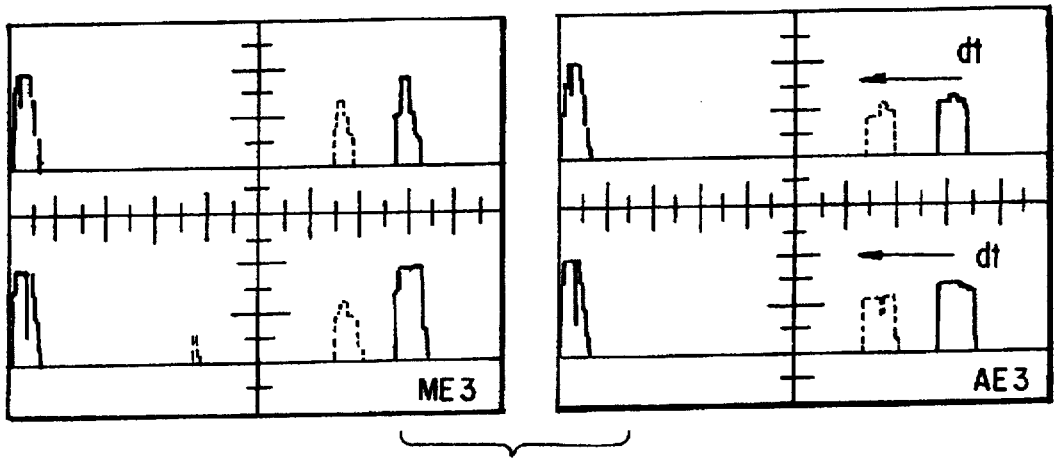
Figure 3D:
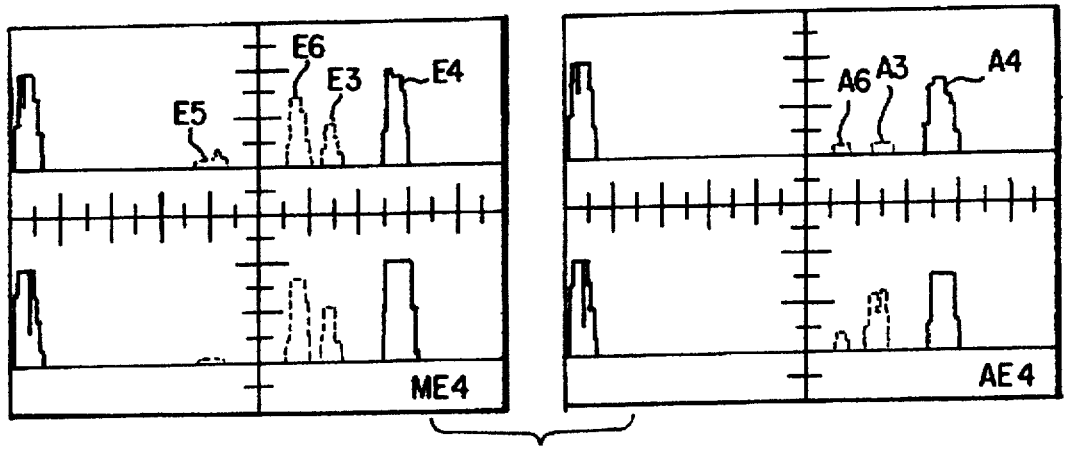

In the manner described above with respect to the second measuring cycle, the process is then continued for the following measuring cycles (FIGS. 3C–3F). In the case of the third measuring echogram (ME3) in FIG. 3C, the weak spurious echoes have almost completely disappeared. The third echo (E3) has become weaker, while the amplitude of the fourth echo (E4) increases. (Such weakening of the third echo (E3) may occur, for example, because the magnitude of the associated noise source varies, or as shown in FIG. 1 in this instance, the reflecting surface is located in a side region outside the path of the vehicle, and therefore leaves the monitoring area of the vehicle, or changes its orientation relative to the vehicle, as it approaches and ultimately passes.) In addition, it now becomes clear, because of the higher amplitude in the lower echogram (from converter 5), that the object belonging to the fourth echogram (E4) is situated closer to the converter 5, which is mounted on the right. As indicated above, the echo transit time changes from one measuring cycle to the next for objects with respect to which the vehicle 1 is moving. So that this effect will not lead also to a gradual weakening of inherent echoes, vehicle movement is compensated in the analysis echograms, which compensation, in the illustrated case, first occurs in the third analysis echogram (AE3) (FIG. 3C). For this purpose, the system receives information concerning the speed (v) of the moving vehicle 1. (A typical driving speed is 1 m/s.) On the basis of this speed information, the analysis system displaces the data received for the third analysis echogram (AE3) by an appropriate time increment (dt), that is, by an appropriate number of scanning time intervals. In this manner, the reinforcing effect of the evaluation process is maintained particularly for all standing objects, and also for objects which, compared with the vehicle speed (v), move only slowly.

In the fourth measuring cycle (FIG. 3D), a new echo group (E5) occurs whose duration, although similar to that of a typical inherent echo, can be neglected because of its low amplitude. Furthermore, a new high-amplitude echo (E6) occurs, while the amplitude of the third echo (E3) decreases gradually and is therefore slowly found to be a spurious echo. In contrast, the fourth echo (E4) shows a continually increasing significance which is particularly strongly manifested in the fourth analysis echogram (AE4). In addition, in this analysis echogram (AE4), the analysis echo (A6) of the newly added strong echo (E6) occurs for the first time while, for the one converter, the third analysis echo (A3) is considerably reduced because the associated measuring echo (E3) no longer reaches the threshold value.

Figure 3E:
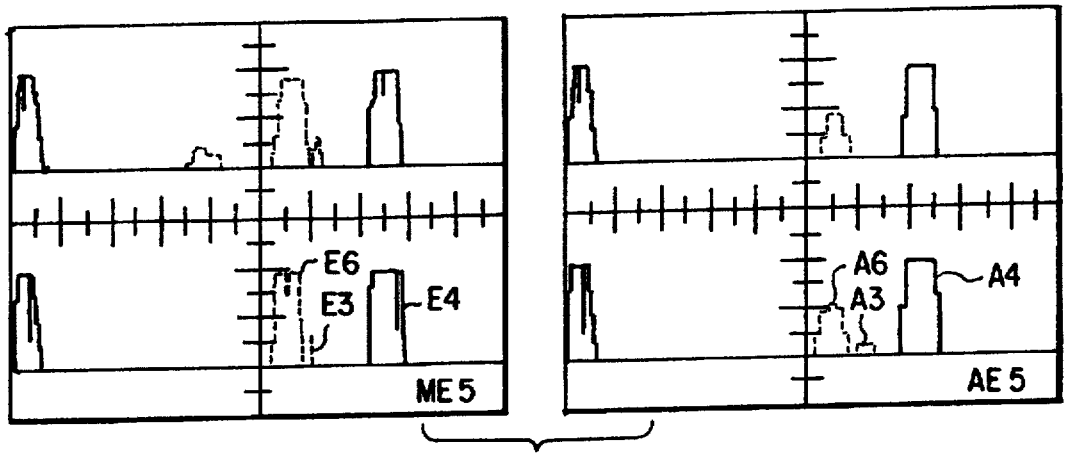
Figure 3F:
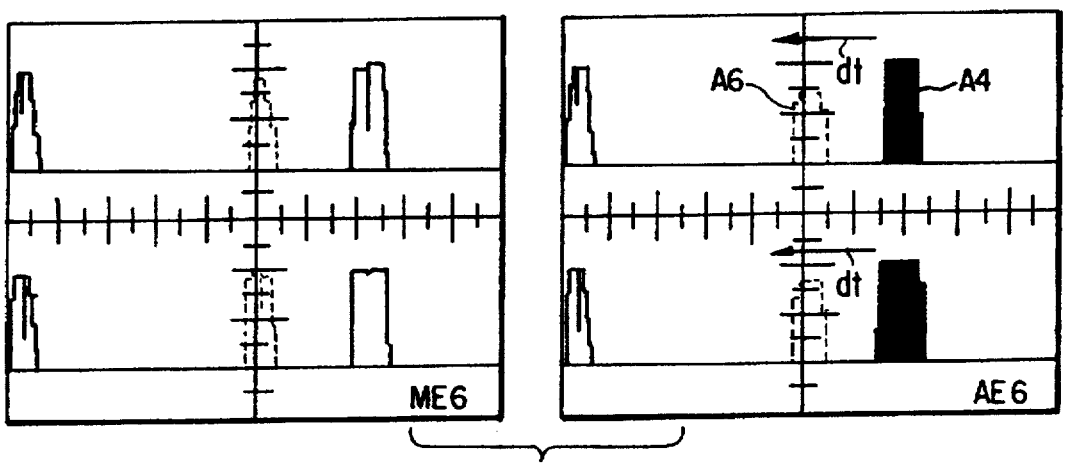

In the measuring echogram (ME5) of the fifth measuring cycle, shown in FIG. 3E, the above-described evolution continues. The third echo (E3) is very weak, and the fifth echo (E5) remains weak, as well. The sixth echo (E6), on the other hand, becomes stronger. In addition, the fourth echo (E4) slowly moves toward saturation of the ultrasound receivers. Correspondingly, the fifth analysis echogram (AE5) is absent. The third analysis echo (A3) is eliminated with the exception of a slight remainder so that it is now clearly identified as a spurious echo. In contrast, in addition to the fourth echo (E4), the newly added analysis echo (A6) is gaining in significance.

In the echogram (ME6) of the sixth measuring cycle (FIG. 3F), the fourth echo (E4) gradually obtains a rectangular signal course. Despite the diffuse reflection characteristics of the object associated with this echo (E4) (as evidenced by the preceding measuring cycles), the reflected portion is now so large that the reception amplifiers enter saturation. This development indicates that this echo (E4) is to be assigned to the person 12 situated in the lane 2.

When the sixth analysis echogram (AE6) was obtained, the time increment displacement (dt) was again carried out as in the case of the third analysis echogram (AE3), to take into account the vehicle speed (v). The analysis echogram (AE6) which exists at the conclusion of the illustrated measuring cycle sequence clearly shows the intensification of continuously existing, relatively high-amplitude echoes which are permanently time correlated with the original ultrasound pulses (SE), such as is typical of inherent echoes of obstacles situated in the main emission direction of the ultrasound pulses, particularly. Uncorrelated and/or short-term and/or very low-amplitude echoes, which are typical of spurious and outside echoes, on the other hand, are suppressed. In this case, outside echo suppression is supported by the above-mentioned randomly distributed variation of the measuring cycle duration. By means of the described evaluation process, inherent echoes can therefore be determined clearly and markedly from the totality of the receives ultrasound echoes.

After the respective scanning time intervals have been considered individually in the previous six measuring cycles, the query 25 in the flow diagram of FIG. 2 is answered in the affirmative, and an obstacle evaluation is now carried out, based on the received sixth analysis echogram (AE6). The obstacle detection step 27 contains the following analysis of the sixth analysis echogram (AE6) illustrated in FIG. 4 as the oscilloscope image.

Figure 4:
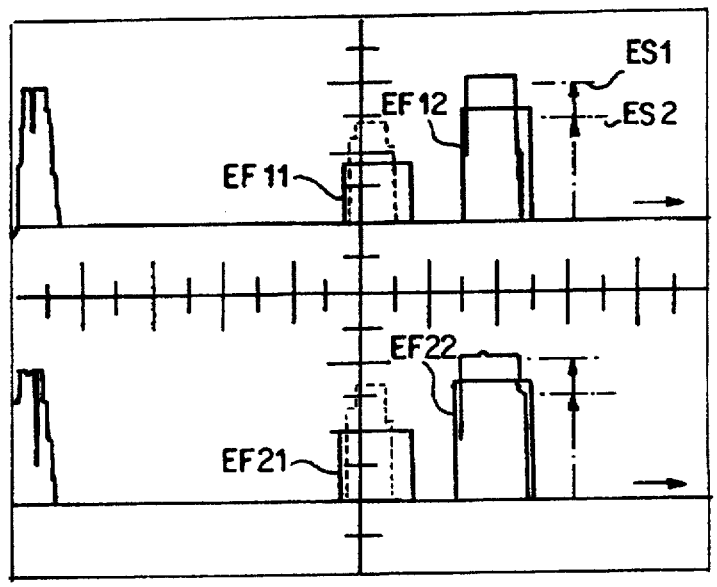
FIG. 4 is a view of an echogram which illustrates an obstacle detecting analysis according to the process for the analysis echogram of FIG. 3B which is last in time.

An upper threshold value (ES1) and a lower threshold value (ES2) are preset for obstacle detection according to the particular operating environment. Then respective smoothed echo envelope curves (EF11, EF12, EF21, EF22) are formed for the analysis echo envelope curves of the sixth analysis echogram. For this purpose, the individual echograms of the individual converters which are contained in the sixth analysis echogram (AE6) are each searched to identify points at which the respective envelope curve exceeds a preset threshold value. For such points the raw echo envelope curve is locally integrated over a short predetermined local integration time period or "window" (for example, on the order of 2 ms) around such point, and the result is then taken as a function value to form a smoothed or shaped echo envelope curve as shown in FIG. 4 (EF11, EF12, EF21, EF22). The amplitude and width of the smoothed echo envelope curves are thus determined by this local smoothing integration process, which may be regarded as a local mean value generating process.

For the purpose of comparison, in FIG. 4 the respective echoes of the sixth analysis echogram (AE6), as illustrated in FIG. 3B, are shown superimposed on the strongly edged, smoothed echo envelope curves (EF11 to E22). The smoothed echo envelope curves (EF21, EF22; EF11, EF12) determined for the two converters 5, 6 are then compared with the fixed threshold values (ES1, ES2) as well as with one another as follows, in order to draw conclusions on the presence or absence of an obstacle.

On the one hand, an obstacle report will always take place when one of the smoothed echo envelope surfaces (EF11 to EF22) exceeds the upper threshold value (ES1). In addition, an obstacle report takes place for echoes of the two converters 5, 6 which are associated with the same object, when a smoothed echo envelope curve value occurs which, although smaller in each case than the upper threshold value (ES1), is larger than the lower threshold value (ES2). For example, FIG. 4, this means that, for those smoothed echo envelope curves (EF12, EF22) which originate from the person 12 situated in the driving lane 2, an obstacle report takes place to the DTS. Together with the data of the other converters 7, 8, the position of the obstacle (here, the person 12) can thereby be determined very precisely, both parallel and transversely to the driving direction, from the time-related position of the envelope curves and their time differences between the converters. The vehicle may then first change to a slow drive and, then stop when the distance tot he obstacle falls below a critical value.

After the detection step 27, the program sequence of FIG. 2 is continued with a query (step 28) as to whether the ultrasound obstacle detection measurement is to be continued (which may be determined, for example by the position of a switch, the process continuing until the switch is turned off). If the answer is "yes", the parameter adaptation step 26 is repeated, and the parameters are again set corresponding to possible already detected obstacles. If a continuation is not desired, the program sequence will end (step 29).

Figure 5:
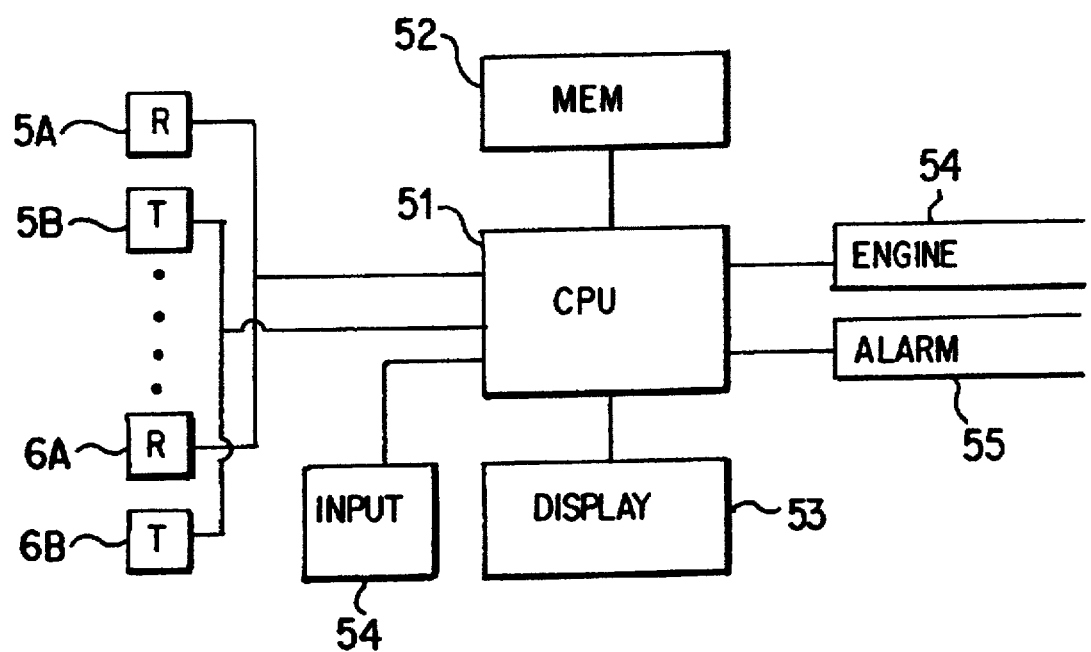
FIG. 5 is a schematic diagram of an apparatus for detecting obstacles according to the process shown in FIG. 2.

FIG. 5 is a schematic diagram of an apparatus for detecting obstacles by means of the ultrasound process described above. Ultrasound pulses are emitted by the respective transmitter units 5B, 6B and returning ultrasound waves are detected by the receiver units 5A, 6A. (As indicated in FIG. 1, of course, there may be any number of transmitter/receiver units, two being shown in FIG. 5 for the purpose of illustration.) Measurement and processing of the returned ultrasound waves according to the flow chart in FIG. 2 are performed in the CPU 51, which has an internal A-D converter. The memory 52 includes both a ROM portion for storing program information and predetermined data such as threshold values, predetermined route and obstacle information and the like, as well as a RAM portion for storing calculated echo and envelope values. A visual display 53 and an input device such as a keyboard may also be provided for interface with a system operator, and for displaying the results of processing if desired. An output from the CPU 51 issues commands to an engine control unit 54 causing the vehicle to slow or come to a stop as described previously, when an obstacle appears within a predetermined area relative to the vehicle. If desired, an alarm 55 may also be provided to alert system operating personnel that normal vehicle operation has been interrupted.

Even for the difficult circumstances of FIG. 1, in which a narrow lane 2 bounded by lateral reinforcements is to be monitored to detect obstacles, by amplitude evaluation of the echo envelope curves of successive measuring cycles, the above-mentioned process achieves a highly reliable obstacle detection. It is understood that, in addition to the concrete example described above in detail, a plurality of process variants can be implemented within the scope of the invention determined by the claims. In particular, the process according to the invention can be used not only by a moving ultrasound obstacle detection system, but also by a stationary system.

In a particularly advantageous embodiment, the measured echo envelope curves developed in the individual measuring cycles are compared with previously stored envelope curves to determine whether an inherent echo is present, and the type of object from which it originates. In this case, either the envelope curves of the measured echoes directly or the envelope curves of the analysis echoes derived therefrom can be used for this comparison. In either case, this embodiment utilizes the proposition that the envelope curves are frequently characteristic of specific obstacles. Because of the shape and mainly because of the reflection characteristics of clothes, this applies particularly to persons, so that a rapid and secure obstacle detection (for example, in the case of the above-described driverless transport system) provides a further increased protection from the vehicles for persons in the storage depot lanes.

The envelope curves to be stored ahead of time in this case may be obtained by a computer simulation, or preferably by means of preceding test drives. In addition, for application to a driverless transport system, ultrasound echo data which were previously stored in the system in this manner may, in addition, for the application in the driverless transport system, be used to teach the vehicle a certain driving course. If then, in the later operation, significantly different echo courses occur, these may very rapidly be assessed by the vehicle as obstacles. Even if this envelope curve comparison with stored data is implemented without the additional echo envelope curve evaluation with the setting up of analysis echograms, which naturally is possible, this still results in an improvement in the obstacle detection compared with the conventional pure transit time measurement.

Furthermore, an additional braking distance control can provide increased protection of persons for such a driverless transport system by means of the ultrasound obstacle detecting system. In this case, in addition to the braking distance control which conventionally exists in a driverless transport vehicle, the ultrasound obstacle detecting system redundantly controls the braking system, and stops the vehicle when the braking distance exceeds a detected distance from the obstacle. For this additional function, the ultrasound obstacle detecting system has inputs which process digital signals of rotary pulse generators or analog signals of tachogenerators, and can cause the braking distance to be calculated by the time-related linking of correspondingly emitted stop commands.

Although the invention has been described and illustrated in detail, it is to be clearly understood that the same is by way of illustration and example, and is not to be taken by way of limitation. The spirit and scope of the present invention are to be limited only by the terms of the appended claims.

I claim:
1. Process for detecting obstacles by means of emitted radiation pulses, comprising the steps of:
   emitting at least a radiation pulse during successive measuring cycles, from at least one ultrasound emitter unit;
   detecting reflected radiation by means of at least a corresponding receiver unit, and forming measured echograms in successive measuring cycles; and
   forming analysis echograms based on evaluation of said measured echograms, each of said analysis echograms being formed by modification of a previous analysis echogram in response to information contained in a newly formed measured echogram;

wherein echo envelope curve amplitudes in a preceding analysis echogram are increased at points at which amplitudes in a newly formed measured echogram are higher than a first threshold value, and are decreased at points at which said amplitudes are less than a second threshold value.

2. Process according to claim 1 wherein smoothed echo envelope curves of at least one of measured echograms and analysis echograms are compared with stored echo envelope curves of predetermined situation-analogous corresponding echograms, the result of the comparison being used for determining the presence of obstacles.

3. Process according to claim 2 further comprising the steps of:

detecting speed of said at least one ultrasound receiver unit; and shifting a time scale of the analysis echograms based on detected speed.

4. Process according to claim 3 wherein an emission level of emitted pulses is adjusted so that a range of said process is only a little larger than the distance of an obstacle recognized as being the closest.

5. Process according to claim 4 wherein time intervals between successively emitted pulses are randomly varied within a predetermined range.

6. Process according to claim 4 wherein:

a reception intensification of said at least one receiver unit during a respective echogram reception is varied with respect to time;

said intensification is varied in a preset manner as a function of the time after the emission of a respective pulse corresponding to a given characteristic curve, and said intensification is additionally raised in a respective corresponding time range in comparison to a characteristic curve value when an obstacle echo is recognized, or is additionally reduced when an erroneous echo is recognized.

7. Process according to claim 6 wherein said function increases monotonically with time.

8. Process according to claim 1 wherein:

said first threshold value is equal to said second threshold value;

the decrease in amplitude is performed by multiplication of an amplitude in a preceding analysis echogram by a factor which is less than one; and the increase in amplitude is performed by addition of an amplitude of a newly formed measured echogram to an amplitude of a preceding analysis echogram.

9. Process according to claim 8, further comprising the steps of:

determining smoothed echo envelope curves of a respective analysis echogram;

comparing said smoothed echo envelope curves with an upper threshold value and a lower threshold value; and concluding that an obstacle exists when either of the following is true: a smoothed echo envelope curve is larger than the upper threshold value, and the smoothed echo envelope curve of coherent echoes of adjacent ultrasound receiver units is in each case larger than the lower threshold value.

10. Process according to claim 9 wherein envelope curves of at least one of measured echograms and analysis echograms are compared with stored envelope curves of predetermined situation-analogous corresponding echograms, the result of the comparison being used for determining the presence of obstacles.

11. Process according to claim 1, wherein said radiation comprises ultrasound radiation, said emitter unit is an ultrasound emitter, and said receiver unit is an ultrasound receiver.

12. Apparatus for detecting obstacles by means of emitted radiation, comprising:

at least one emitter unit for emitting radiation pulses during successive measuring cycles;

at least one receiver unit for detecting reflected radiation from pulses emitted by said at least one emitter unit;

means for forming measured echograms from said reflected radiation in successive measuring cycles; and means for forming analysis echograms based on evaluation of said measured echograms, each of said analysis echograms being formed by modification of a previous analysis echogram based on information contained in a newly formed measured echogram;

wherein echo envelope curve amplitudes in a preceding analysis echogram are increased at points at which amplitudes in a newly formed measured echogram are higher than a first threshold value, and are decreased at points at which said amplitudes are less than a second threshold value.

13. Apparatus according to claim 12, wherein said radiation is ultrasound radiation.

* * * * *